United States Patent

Nagayama et al.

(10) Patent No.: US 11,124,457 B2
(45) Date of Patent: Sep. 21, 2021

(54) PINK ZIRCONIA SINTERED BODY AND MANUFACTURING METHOD OF THE SAME

(71) Applicant: TOSOH CORPORATION, Yamaguchi (JP)

(72) Inventors: Hitoshi Nagayama, Yamaguchi (JP); Hajime Funakoshi, Yamaguchi (JP); Hiroyuki Fujisaki, Yamaguchi (JP); Takashi Tsukimori, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/791,089

(22) Filed: Feb. 14, 2020

(65) Prior Publication Data

US 2020/0262759 A1 Aug. 20, 2020

(30) Foreign Application Priority Data

Feb. 15, 2019 (JP) .............................. JP2019-025854
Feb. 15, 2019 (JP) .............................. JP2019-025861
Feb. 15, 2019 (JP) .............................. JP2019-025870

(51) Int. Cl.
C04B 35/488 (2006.01)
C04B 111/82 (2006.01)

(52) U.S. Cl.
CPC ........ *C04B 35/4885* (2013.01); *C04B 2111/82* (2013.01); *C04B 2235/3272* (2013.01); *C04B 2235/3277* (2013.01)

(58) Field of Classification Search
CPC ........ C04B 2235/3246; C04B 35/4885; C04B 2111/82; C04B 2235/3272; C04B 2235/3277; C04B 2237/565; C04B 2237/068; C04B 2237/348; C04B 14/4637; C04B 2235/5236

See application file for complete search history.

(56) References Cited

U.S. PATENT DOCUMENTS

2017/0143458 A1* 5/2017 Fujisaki .............. C04B 35/4885

FOREIGN PATENT DOCUMENTS

| EP | 2298713 A1 * | 3/2011 | ........... C04B 35/486 |
|----|------------|--------|--------|
| EP | 2336097 A1 * | 6/2011 | ........... G04B 37/225 |
| JP | 62-59571 | 3/1987 | |
| JP | 2005306678 | * 4/2005 | |
| JP | 2011-20875 | 2/2011 | |
| JP | 2014141393 | * 7/2014 | |
| JP | 2014-141393 | 8/2014 | |
| JP | 2017-165599 | 9/2017 | |

OTHER PUBLICATIONS

JP2014141393 machine translation via EspaceNet (Year: 2014).*
JP2005306678 machine translation via EspaceNet (Year: 2005).*

* cited by examiner

*Primary Examiner* — Karl E Group
*Assistant Examiner* — Cameron K Miller
(74) *Attorney, Agent, or Firm* — Greenblum & Bernstein, P.L.C.

(57) ABSTRACT

A zirconia sintered body comprising 3.0 wt % or more and 30.0 wt % or less of aluminum in terms of $Al_2O_3$ and a remainder is zirconia containing 2 mol % or more and 4 mol % or less of erbia, in which the zirconia sintered body includes grains of aluminum oxide, and a total light transmittance with respect to a D65 light source at a sample thickness of 1.0 mm is 10% or less.

14 Claims, No Drawings

PINK ZIRCONIA SINTERED BODY AND MANUFACTURING METHOD OF THE SAME

CROSS-REFERENCE TO RELATED APPLICATIONS

The present application claims priority under 35 U.S.C. § 119 of Japanese Application Nos. 2019-025854, 2019-025861, and 2019-025870, filed on Feb. 15, 2019, the disclosure of which is expressly incorporated by reference herein in its entirety.

BACKGROUND OF THE INVENTION

1. Field of the Invention

The present disclosure is related to a zirconia sintered body exhibiting a pink-group color tone.

2. Description of Related Art

A zirconia sintered body is known that exhibits a desired coloration by including a lanthanoid rare earth element or transition metal element as a colorant (Japanese Patent Laid-open Publication Nos. S62-59571, 2011-020875, 2014-141393, and 2017-165599). Zirconia sintered bodies containing colorant (hereafter also referred to as a "colored zirconia sintered body") are used in conventional applications such as machinery, and have also come to be used in applications where aesthetics are a requirement, such as decorative components and exterior components. As the range of applications increases, workability is also required, and not just differentiated design.

A zirconia sintered body that exhibits a pink-group color tone has good decorative characteristics, and has also been investigated for applications as a thin component having a thickness of 1 mm or less due to machining such as grinding. Conventionally, a zirconia sintered body that includes erbia ($Er_2O_3$) as a colorant has been reported as a sintered body exhibiting a pink-group color tone (Japanese Patent Laid-open Publication Nos. S62-59571, 2011-020875, 2014-141393, and 2017-165599). However, due to the translucency deriving from zirconia containing erbia, these conventional zirconia sintered bodies exhibiting pink-group color tones exhibit color tones that are muddied by the color tone of components serving as a backing and are visually recognized as a different color tone than the original color tone of the sintered body when the thickness of the sintered body is 1 mm or less.

SUMMARY OF THE INVENTION

In view of the above, the present disclosure provides a zirconia sintered body that includes erbia ($Er_2O_3$) and that can be visually recognized as a sintered body exhibiting any color tone selected from a group of pink-group color tones, in particular a pale pink color, a bright pink color, and a warm pink color, even when the thickness of the sintered body is 1 mm or less.

Specifically, the present disclosure may be summarized as follows.

[1] A zirconia sintered body comprising 3.0 wt % or more and 30.0 wt % or less of aluminum in terms of $Al_2O_3$ and a remainder is zirconia containing 2 mol % or more and 4 mol % or less of erbia. The zirconia sintered body includes grains of aluminum oxide, and a total light transmittance with respect to a D65 light source at a sample thickness of 1.0 mm is 10% or less.

[2] The zirconia sintered body noted above in [1] in which a color tone at a sample thickness of 0.5 mm satisfies the following conditions:

$$50 \leq L^* \leq 100, 0 \leq a^* \leq 15, -2.0 \leq b^* \leq 20$$

[3] The zirconia sintered body noted above in [1] or [2] in which the maximum value of $\Delta b^*$ calculated using Formula A below is 3.0 or less, and the maximum value of $\Delta a^*$ calculated using Formula B below is 0.6 or less.

$$\Delta b^* = b^*_n / b^*_{(-50)} \quad \text{(Formula A)}$$

$$\Delta a^* = a^*_n / a^*_{(-50)} \quad \text{(Formula B)}$$

In each of the formulas above, $\Delta a^*$ and $\Delta b^*$ are, respectively, a difference in hues $a^*$ and a difference in hues $b^*$ between light receiving angles. $a^*_n$ and $b^*_n$ are, respectively, the hue $a^*$ and hue $b^*$ at any one light receiving angle of $-50°$ or more to $30°$ or less. Further, $a^*_{(-50)}$ and $b^*_{(-50)}$ are, respectively, the hue $a^*$ and the hue $b^*$ at a light receiving angle of $-50°$.

[4] The zirconia sintered body noted above in any one of [1] to [3] contains 0.1 wt % or more and 2.0 wt % or less of iron in terms of $Fe_2O_3$, and 0.1 wt % or more and 1.0 wt % or less of cobalt in terms of $Co_3O_4$, and has a total light transmittance with respect to the D65 light source at a sample thickness of 1.0 mm of 1% or less.

[5] The zirconia sintered body noted above in any one of [1] to [4], in which cobalt content is less than iron content.

[6] The zirconia sintered body noted above in any one of [1] to [5] in which the color tone at a sample thickness of 0.5 mm satisfies the following conditions:

$$50 \leq L^* \leq 74, 0 \leq a^* \leq 5, 2 \leq b^* \leq 10$$

[7] The zirconia sintered body noted above in any one of [1] to [6] in which the total light transmittance with respect to the D65 light source at a sample thickness of 0.5 mm is 3% or less.

[8] The zirconia sintered body noted above in any one of [1] to [3] in which the iron content relative to the weight of the sintered body is less than 0.1 wt % in terms of $Fe_2O_3$.

[9] The zirconia sintered body noted above in any one of [1], [2], [3], or [7] in which the color tone at a sample thickness of 0.5 mm satisfies the following conditions:

$$50 \leq L^* \leq 74, 0 \leq a^* \leq 5, 2 \leq b^* \leq 10$$

[10] The zirconia sintered body noted above in any one of [1] to [3], comprising 0.01 wt % or more and 2.0 wt % or less of iron in terms of $Fe_2O_3$, and less than 0.1 wt % of cobalt in terms of $Co_3O_4$, and zirconia containing 2 mol % or more and 4 mol % or less of erbia as a remainder. The zirconia sintered body includes grains of aluminum oxide, and the total light transmittance with respect to the D65 light source at a sample thickness of 1.0 mm is 5% or less.

[11] The zirconia sintered body noted above in any one of [1], [2], [3], or [9] in which the total light transmittance with respect to the D65 light source at a sample thickness of 0.5 mm is 8% or less.

[12] The zirconia sintered body noted above in any one of [1], [2], [3], [9], or [10] in which the color tone at a sample thickness of 0.5 mm satisfies the following conditions:

$$75 \leq L^* \leq 98, 0 \leq a^* \leq 10, 5 \leq b^* \leq 20$$

[13] The zirconia sintered body noted above in any one of [1] to [12] in which the aluminum oxide is alumina.

[14] The zirconia sintered body noted above in any one of [1] to [13] in which the zirconia is zirconia in a state where a zirconia sol containing erbia has been heat-treated and the resulting zirconia has been sintered.

[15] A component that includes the zirconia sintered body noted above in any one of [1] to [14].

According to the present disclosure, a zirconia sintered body can be provided that includes erbia ($Er_2O_3$) and that can be visually recognized as a sintered body exhibiting any color tone selected from a group of pink-group color tones, in particular a pale pink color, a bright pink color. and a warm pink color, even when the thickness of the sintered body is 1 mm or less.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an exemplary zirconia sintered body according to the present disclosure is described with reference to an embodiment of the zirconia sintered body.

The present embodiment is a zirconia sintered body comprising 3.0 wt % or more and 30.0 wt % or less of aluminum in terms of $Al_2O_3$ and a remainder is zirconia containing 2 mol % or more and 4 mol % or less of erbia. The zirconia sintered body includes grains of aluminum oxide, and a total light transmittance with respect to a D65 light source at a sample thickness of 1.0 mm is 10% or less. The sintered body of the present embodiment may include an element that is at least one of iron and cobalt.

In the present embodiment, each of the elements aluminum (Al), iron (Fe), and cobalt (Co) act as respective colorants, whereas erbia ($Er_2O_3$) acts as a colorant and stabilizer.

In the zirconia sintered body of the present embodiment, the aluminum oxide grains are considered to be contained not only on the surface of the sintered body but also within the sintered body, and with such a structure, the total light transmittance with respect to the D65 light source at a sample thickness of 1 mm is considered to be 10% or less, preferably 9% or less, and more preferably 8% or less.

In this example, the "total light transmittance" of the present embodiment is transmittance that is the sum of diffuse transmittance and In-line transmittance. When the D65 light source is used as incident light, the total light transmittance is equivalent to the transmittance for this incident light. The total light transmittance can be measured for a surface having a surface roughness (Ra) of 0.02 μm or less, using a method according to JIS K 7361.

The zirconia sintered body of the present embodiment preferably has a color tone at a sample thickness of 0.5 mm that satisfies the following conditions:

$$50 \leq L^* \leq 100, 0 \leq a^* \leq 15, -2.0 \leq b^* \leq 20$$

An example of measuring the color tone is to measure a measurement sample with a sample thickness of 0.5 mm and a surface roughness Ra≤0.02 μm using a spectrophotometer (for example, model name: CM-700d, manufactured by Konica Minolta, Inc.) under the following conditions:

Light source: F2 light source
View angle: 10°

When a sintered body containing a conventional colorant is visually observed, there are occasions where the color tone is vastly different depending on the angle of the visual observation. In contrast, it is preferred that the sintered body according to the present embodiment have smaller differences in color tone due to the angle of the visual observation, i.e., that the differences in color tone (hereafter also referred to as "color differences") for reflected light of different angles be kept small. When the color differences are small, depth of the color tone is amplified and the aesthetics are more readily heightened in the sintered body according to the present embodiment.

A difference in at least one of the hue a* and the hue b* between light receiving angles can be used as a parameter for color differences. In a sintered body according to the present embodiment that exhibits a pink-group color tone, preferably the differences in both the hue a* and the hue b* between light receiving angles are used as a parameter.

For the sintered body according to the present embodiment, the maximum value of Δb* (hereafter also referred to as "$b^*_{MAX}$") obtained from Formula A below is preferably 3.0 or less, and more preferably 1.0 or less. Also, for the sintered body according to the present embodiment, the maximum value of Δa* (hereafter also referred to as "$a^*_{MAX}$") obtained from Formula B below is preferably 0.6 or less, and more preferably 0.5 or less. The lower limit values of Δa* and Δb* are 0 or more, respectively, and signify that there are no differences in hue between the light receiving angles.

$$\Delta b^* = b^*_n / b^*_{(-50)} \quad \text{(Formula A)}$$

$$\Delta a^* = a^*_n / a^*_{(-50)} \quad \text{(Formula B)}$$

In each of the formulas above, Δa* and Δb* are, respectively, a difference in the hue a* and a difference in the hue b* between the light receiving angles. $a^*_n$ and $b^*_n$ are, respectively, the hue a* and the hue b* at any one light receiving angle of −50° or more to 30° or less. Further, $a^*_{(-50)}$ and $b^*_{(-50)}$ are, respectively, the hue a* and the hue b* at a light receiving angle of −50°. $a^*_n$, $b^*_n$, $a^*_{(-50)}$, and $b^*_{(-50)}$ can be measured with the following conditions:

Light source: F2 light source
Incident angle: 60°
Light receiving angle: −50°~30°
Measurement sample:
(Shape) Plate shape of 50 mm×50 mm×3 mm (vertical, horizontal, thickness)
(Surface roughness) Ra≤0.02

The sintered body according to the present embodiment preferably has a lower translucency than a zirconia sintered body that does not contain colorant, and also preferably has smaller values of Δa* and Δb* than a zirconia sintered body that does not contain colorant.

One embodiment of the present disclosure is a zirconia sintered body exhibiting a pale pink color.

The zirconia sintered body according to the present embodiment is a zirconia sintered body, comprising 0.1 wt % or more and 2.0 wt % or less of iron in terms of $Fe_2O_3$, and 0.1 wt % or more and 1.0 wt % or less of cobalt in terms of $Co_3O_4$, and zirconia containing 2 mol % or more and 4 mol % or less of erbia as a remainder. The zirconia sintered body includes grains of aluminum oxide, and the total light transmittance with respect to the D65 light source at a sample thickness of 1.0 mm is 1% or less.

In the present embodiment, the zirconia sintered body is a sintered body having zirconia as its matrix (main phase), and is primarily configured from zirconia crystal grains. The zirconia sintered body according to the present embodiment may include grains other than zirconia, such as aluminum oxide grains.

In the present embodiment, each of the elements aluminum (Al), iron (Fe), and cobalt (Co) act as respective colorants, whereas erbia ($Er_2O_3$) acts as a colorant and stabilizer.

Aluminum content is 3.0 wt % or more and 30.0 wt % or less in terms of $Al_2O_3$, preferably 3.0 wt % or more and 25.0 wt % or less, more preferably 3.0 wt % or more and 10.0 wt % or less, and still more preferably 3.0 wt % or more and 7.0 wt % or less.

Iron content is 0.1 wt % or more and 2.0 wt % or less in terms of $Fe_2O_3$, preferably 0.1 wt % or more and 0.5 wt % or less, and more preferably 0.1 wt % or more and 0.3 wt % or less. Cobalt content is 0.1 wt % or more and 1.0 wt % or less in terms of $Co_3O_4$, preferably 0.1 wt % or more and 0.5 wt % or less, and more preferably 0.1 wt % or more and 0.2 wt % or less. Furthermore, the cobalt content is preferably less than the iron content.

The content of aluminum, iron, and cobalt is a ratio of the weight of each relative to the weight of the sintered body.

It is believed that by configuring the sintered body to contain aluminum and a sufficiently small amount of iron and cobalt relative to the aluminum, in addition to the matrix composed of zirconia containing erbia, the zirconia sintered body according to the present embodiment exhibits a pink-group color tone that can be visually recognized as a different color tone from that of the matrix.

The aluminum, iron, and cobalt in the sintered body according to the present embodiment is preferably contained in the form of an aluminum oxide, an iron oxide, and a cobalt oxide, respectively. In addition, the elements may be contained in the form of a composite oxide that includes two or more kinds chosen from the group of aluminum oxides, iron oxides, and cobalt oxides as well as aluminum, iron, and cobalt. The aluminum, iron, and cobalt respectively may also have a portion thereof that has formed a solid solution with zirconia.

The zirconia is a zirconia containing erbia (hereafter also referred to as "erbia-containing zirconia"), and is preferably zirconia that is stabilized with erbia (hereafter also referred to as "erbia-stabilized zirconia"). The erbia content of the zirconia, in terms of erbia relative to the total amount of zirconia and erbia in the sintered body, is 2.0 mol % or more and 4.0 mol % or less, preferably 2.5 mol % or more and 3.5 mol % or less.

The zirconia may be zirconia that contains, in addition to erbia, a stabilizer that does not affect the color tone, for example, zirconia that is stabilized with erbia and at least one of yttria ($Y_2O_3$) or calcia (CaO). Examples may include yttria at less than 1.47 mol %, or further at 1.0 mol % or less, in terms of yttria relative to the total amount of zirconia and yttria in the sintered body. The pink-group coloration is more readily obtained even when the sintered body is configured as a component with a thickness of 1 mm or less (hereafter also referred to as "a thin component"). Therefore, it is preferable that the zirconia contain effectively no stabilizer other than erbia.

As another embodiment, the zirconia is preferably zirconia in a state where a zirconia sol containing erbia has been heat-treated and the resulting zirconia has been sintered; is more preferably zirconia in a state where a zirconia sol containing erbia obtained by hydrolysis has been heat-treated and the resulting zirconia has been sintered; and is still more preferably zirconia in a state where a zirconia sol containing erbia obtained by hydrolysis of zirconium oxychloride has been heat-treated and the resulting zirconia has been sintered.

The zirconia preferably includes a tetragonal system in its crystal phase, and more preferably the crystal phase is tetragonal and cubic.

The zirconia sintered body according to the present embodiment may include impurities to the extent that the impurities do not affect color tone when the sintered body is visually inspected (for example, impurities such as lanthanoid rare earth elements or metallic elements), but preferably does not include impurities other than hafnium or other unavoidable impurities. Examples may include the zirconia sintered body according to the present embodiment containing effectively no zinc, having a zinc content relative to the weight of the sintered body of less than 0.08 wt % in terms of ZnO, and further having a zinc content of 0.05 wt % or less.

The zirconia sintered body according to the present embodiment has the composition described above and also contains grains of aluminum oxide. This inhibits translucency deriving from the zirconia, and as a result even when the sample is configured to be thin in a thickness direction, it is believed that the color tone of the sample is less likely to change from the original color tone of the sintered body. The aluminum oxide is preferably alumina ($Al_2O_3$).

Furthermore, in the zirconia sintered body according to the present embodiment, the aluminum oxide grains are considered to be contained not only on the surface of the sintered body but also within the sintered body. With such a structure, the total light transmittance with respect to the D65 light source at a sample thickness of 1 mm is considered to be 1% or less, preferably 0.5% or less, and more preferably 0.1% or less. Preferably, the zirconia sintered body according to the present embodiment has a total light transmittance with respect to the D65 light source of 3% or less, more preferably 1.5% or less, and still more preferably 1% or less even when the sample thickness is 0.5 mm.

The average crystal grain size of the zirconia crystal grains (hereafter also referred to simply as "average crystal grain size") is a value found using a planimetric method that employs an SEM observation image of the sintered body obtained by scanning electron microscope observation. A circle of known area is drawn on the SEM observation image and the number of crystal grains within the circle (Nc) and the number of crystal grains on the circumference of the circle (Ni) are used in the calculation using the following formula.

$$\text{Average crystal grain size} = (Nc + (1/2) \times Ni)/(A/M^2)$$

In the above formula, Nc is the number of crystal grains within the circle, Ni is the number of crystal grains on the circumference of the circle, A is the area of the circle, and M is the magnification power (5000 times) of the scanning electron microscope. $Nc + Ni \geq 100$, and preferably $Nc + Ni = 125 \pm 25$.

In SEM observation, aluminum oxide grains can be identified as grains with a different color from the zirconia crystal grains, and can be identified as grains that are dispersed at the grain boundary of the zirconia crystal grains. Also, the shape of the aluminum oxide may be an irregular shape, for example.

The color tone of the zirconia sintered body according to the present embodiment preferably has an L*, a*, and b* in L*a*b* color space that satisfy the following conditions. By satisfying the L*, a*, and b* below, the sintered body is visually observed to have a pink-group color tone, and in particular a pale pink color tone.

The color tone can be measured using a method according to JIS Z 8722:2009.

In the zirconia sintered body according to the present embodiment, preferably a color tone at a sample thickness of 1.0 mm and a color tone at a sample thickness of 0.5 mm are roughly equal, and preferably the color tone at the sample thickness of 0.5 mm is:

$50 \leq L^* \leq 74$, preferably $50 \leq L^* \leq 70$, more preferably $50 \leq L^* \leq 65$ $0 \leq a^* \leq 5$, preferably $0 \leq a^* \leq 4$, more preferably $1 \leq a^* \leq 3$ $2 \leq b^* \leq 10$, preferably $2 \leq b^* \leq 8$, more preferably $3 \leq b^* \leq 8$ The zirconia sintered body according to the present embodiment preferably has a density of 95.0% or more as a relative density, and preferably 99.5% or more. An example of a density that corresponds to such a density may be a density measured using a method according to JIS R 1634 (hereafter also referred to as a "measured density") that is 5.180 g/cm³ or more and 6.250 g/cm³ or less, and preferably is 5.400 g/cm³ or more and 6.220 g/cm³ or less, for example.

The zirconia sintered body according to the present embodiment preferably has a three-point bending strength that is measured using a method according to JIS R 1601 of 1000 MPa or more, more preferably 1100 MPa or more, and still more preferably 1310 MPa or more. So long as the three-point bending strength is 1600 MPa or less, and further is 1500 MPa or less, the sintered body is more easily worked.

Another embodiment of the present disclosure is a zirconia sintered body exhibiting a bright pink color.

The zirconia sintered body according to the present embodiment is a zirconia sintered body containing 3 wt % or more and 30 wt % or less of aluminum in terms of $Al_2O_3$ and a remainder is zirconia containing 2 mol % or more and 4 mol % or less of erbia. The zirconia sintered body includes grains of aluminum oxide, and the total light transmittance with respect to the D65 light source at a sample thickness of 1.0 mm is 10% or less.

In the present embodiment, the zirconia sintered body is a sintered body having zirconia as its matrix (main phase), and is a sintered body primarily configured from zirconia crystal grains. The zirconia sintered body according to the present embodiment may include grains other than zirconia, such as aluminum oxide grains.

In the present embodiment, the element aluminum acts as a colorant, whereas erbia acts as a colorant and stabilizer.

The aluminum content is 3.0 wt % or more and 30.0 wt % or less in terms of A1203, preferably 3.0 wt % or more and 25.0 wt % or less, more preferably 3.0 wt % or more and 20.0 wt % or less, and still more preferably 5.0 wt % or more and 18.0 wt % or less.

The aluminum content is a ratio of the weight of aluminum relative to the weight of the sintered body.

It is believed that by configuring the sintered body to contain aluminum and a sufficiently small amount of iron and cobalt relative to the aluminum, in addition to the matrix composed of zirconia containing erbia, the zirconia sintered body according to the present embodiment exhibits a pink-group color tone that can be visually recognized as a different color tone from that of the matrix.

The aluminum in the sintered body according to the present embodiment is preferably contained in the form of an aluminum oxide. A portion of the aluminum may also form a solid solution with zirconia.

The zirconia is a zirconia containing erbia ("erbia-containing zirconia"), and is preferably zirconia that is stabilized with erbia ("erbia-stabilized zirconia"). The erbia content of the zirconia, in terms of erbia relative to the total amount of zirconia and erbia in the sintered body, is 2.0 mol % or more and 4.0 mol % or less, preferably 2.5 mol % or more and 3.5 mol % or less.

The zirconia may be zirconia that contains, in addition to erbia, a stabilizer that does not affect the color tone, for example, zirconia that is stabilized with erbia and at least one of yttria or calcia. Examples may include yttria at less than 1.47 mol %, or further at 1.0 mol % or less, in terms of yttria relative to the total amount of zirconia and yttria in the sintered body. The pink-group coloration is more readily obtained even when the sintered body is configured as a component with a thickness of 1 mm or less ("a thin component"). Therefore, it is preferable that the zirconia contain effectively no stabilizer other than erbia.

As another embodiment, the zirconia is preferably zirconia in a state where a zirconia sol containing erbia has been heat-treated and the resulting zirconia has been sintered; is more preferably zirconia in a state where a zirconia sol containing erbia obtained by hydrolysis has been heat-treated and the resulting zirconia has been sintered; and is still more preferably zirconia in a state where a zirconia sol containing erbia obtained by hydrolysis of zirconium oxychloride has been heat-treated and the resulting zirconia has been sintered.

The zirconia preferably includes a tetragonal system in its crystal phase, and more preferably the crystal phase is tetragonal and cubic.

The zirconia sintered body according to the present embodiment may include impurities to the extent that the impurities do not affect color tone when the sintered body is visually inspected (for example, impurities such as lanthanoid rare earth elements or metallic elements), but preferably does not include impurities other than hafnium or other unavoidable impurities. Examples may include the zirconia sintered body according to the present embodiment containing effectively none of one or more elements selected from the group of zinc, iron, and cobalt; having a zinc content relative to the weight of the sintered body of less than 0.08 wt % in terms of ZnO, and further having a zinc content of 0.05 wt % or less; having an iron content relative to the weight of the sintered body of less than 0.1 wt % in terms of $Fe_2O_3$; and having a cobalt content relative to the weight of the sintered body of less than 0.1 wt % in terms of $Co_3O_4$.

The zirconia sintered body according to the present embodiment has the composition described above and also contains grains of aluminum oxide. This inhibits translucency deriving from the zirconia, and as a result even when the sample is configured to be thin in a thickness direction, it is believed that the color tone of the sample is less likely to change from the original color tone of the sintered body. The aluminum oxide is preferably alumina.

Furthermore, in the zirconia sintered body according to the present embodiment, the aluminum oxide grains are considered to be contained not only on the surface of the sintered body but also within the sintered body. With such a structure, the total light transmittance with respect to the D65 light source at a sample thickness of 1 mm is considered to be 10% or less, preferably 9% or less, and more preferably 8% or less. Preferably, the zirconia sintered body according to the present embodiment has a total light transmittance with respect to the D65 light source of 20% or less, more preferably 15% or less, and still more preferably 10% or less even when the sample thickness is 0.5 mm.

In SEM observation, aluminum oxide grains can be identified as grains with a different color from the zirconia crystal grains, and can be identified as grains that are dispersed at the grain boundary of the zirconia crystal grains. Also, the shape of the aluminum oxide may be an irregular shape, for example.

The color tone of the zirconia sintered body according to the present embodiment preferably has an L*, a*, and b* in L*a*b* color space that satisfy the following conditions. By satisfying the L*, a*, and b* below, the sintered body is visually observed to have a pink-group color tone, and in particular a bright pink color tone.

In the zirconia sintered body according to the present embodiment, preferably a color tone at a sample thickness of 1.0 mm and a color tone at a sample thickness of 0.5 mm are roughly equal, and preferably the color tone at the sample thickness of 1.0 mm is:

$89 \leq L^* \leq 100$, preferably $90 \leq L^* \leq 98$, more preferably $90 \leq L^* \leq 95$ $5 \leq a^* \leq 15$, preferably $7 \leq a^* \leq 13$, more preferably $8 \leq a^* \leq 12$ $-2.0 \leq b^* \leq 2.0$, preferably $-1.5 \leq b^* \leq 1.5$, more preferably $-1.0 \leq b^* \leq 1.00$ For the sintered body according to the present embodiment, the maximum value of $\Delta b^*$ ($b^*_{MAX}$) obtained from Formula A above is preferably 3.0 or less, and more preferably 1.0 or less. Also, for the sintered body according to the present embodiment, the maximum value of $\Delta a^*$ ($a^*_{MAX}$) obtained from Formula B above is preferably 0.6 or less, and more preferably 0.5 or less.

The zirconia sintered body according to the present embodiment preferably has a density of 95.0% or more as a relative density, and preferably 99.5% or more. An example of a density that corresponds to such a density may be a density measured using a method according to JIS R 1634 (measured density) that is 5.325 g/cm³ or more and 6.265 g/cm³ or less, and preferably is 5.540 g/cm³ or more and 6.265 g/cm³ or less, for example.

The zirconia sintered body according to the present embodiment preferably has a three-point bending strength that is measured using a method according to TIS R 1601 of 1000 MPa or more, more preferably 1100 MPa or more, and still more preferably 1200 MPa or more. So long as the three-point bending strength is 1600 MPa or less, and further is 1500 MPa or less, the sintered body is more easily worked.

Another embodiment of the present disclosure is a zirconia sintered body exhibiting a warm pink tone.

The zirconia sintered body according to the present embodiment contains 3 wt % or more and 30 wt % or less of aluminum in terms of $Al_2O_3$, 0.01 wt % or more and 2.0 wt % or less of iron in terms of $Fe_2O_3$, and less than 0.1 wt % of cobalt in terms of $Co_3O_4$, and contains zirconia containing 2 mol % or more and 4 mol % or less of erbia as a remainder. The zirconia sintered body includes grains of aluminum oxide, and the total light transmittance with respect to the D65 light source at a sample thickness of 1.0 mm is 5.0% or less.

In the present embodiment, the zirconia sintered body is a sintered body having zirconia as its matrix (main phase), and is a sintered body primarily configured from zirconia crystal grains. The zirconia sintered body according to the present embodiment may include grains other than zirconia, such as aluminum oxide grains.

In the present embodiment, each of the elements aluminum, iron, and cobalt act as respective colorants, whereas erbia acts as a colorant and stabilizer.

Aluminum content is 3.0 wt % or more and 30.0 wt % or less in terms of $Al_2O_3$, preferably 3.0 wt % or more and 25.0 wt % or less, and more preferably 5.0 wt % or more and 20.0 wt % or less.

Iron content is 0.01 wt % or more and 2.0 wt % or less in terms of $Fe_2O_3$, preferably 0.1 wt % or more and 1.5 wt % or less, and more preferably 0.1 wt % or more and 1.0 wt % or less. Cobalt content is less than 0.1 wt % in terms of $Co_3O_4$, preferably 0 wt % or more and 0.05 wt % or less, and more preferably 0.005 wt % or more and 0.03 wt % or less. Furthermore, the cobalt content is preferably less than the iron content.

The content of aluminum, iron, and cobalt is a ratio of the weight of each relative to the weight of the sintered body.

It is believed that by configuring the sintered body to contain aluminum and a sufficiently small amount of iron and cobalt relative to the aluminum, in addition to the matrix composed of zirconia containing erbia, the zirconia sintered body according to the present embodiment exhibits a pink-group color tone that can be visually recognized as a different color tone from that of the matrix.

The aluminum, iron, and cobalt in the sintered body according to the present embodiment is preferably contained in the form of an aluminum oxide, an iron oxide, and a cobalt oxide, respectively. In addition, the elements may be contained in the form of a composite oxide that includes two or more kinds chosen from the group of aluminum oxides, iron oxides, and cobalt oxides as well as aluminum, iron, and cobalt. The aluminum, iron, and cobalt respectively may also have a portion thereof that has formed a solid solution with zirconia.

The zirconia is a zirconia containing erbia ("erbia-containing zirconia"), and is preferably zirconia that is stabilized with erbia ("erbia-stabilized zirconia"). The erbia content of the zirconia, in terms of erbia relative to the total amount of zirconia and erbia in the sintered body, is 2.0 mol % or more and 4.0 mol % or less, preferably 2.5 mol % or more and 3.5 mol % or less.

The zirconia may be zirconia that contains, in addition to erbia, a stabilizer that does not affect the color tone, for example, zirconia that is stabilized with erbia and at least one of yttria or calcia. Examples may include yttria at less than 1.47 mol %, or further at 1.0 mol % or less, in terms of yttria relative to the total amount of zirconia and yttria in the sintered body. The pink-group coloration is more readily obtained even when the sintered body is configured as a component with a thickness of 1 mm or less ("a thin component"). Therefore, it is preferable that the zirconia contain effectively no stabilizer other than erbia.

As another embodiment, the zirconia is preferably zirconia in a state where a zirconia sol containing erbia has been heat-treated and the resulting zirconia has been sintered; is more preferably zirconia in a state where a zirconia sol containing erbia obtained by hydrolysis has been heat-treated and the resulting zirconia has been sintered; and is still more preferably zirconia in a state where a zirconia sol containing erbia obtained by hydrolysis of zirconium oxychloride has been heat-treated and the resulting zirconia has been sintered.

The zirconia preferably includes a tetragonal system in its crystal phase, and more preferably the crystal phase is tetragonal and cubic.

The zirconia sintered body according to the present embodiment may include impurities to the extent that the impurities do not affect color tone when the sintered body is visually inspected (for example, impurities such as lanthanoid rare earth elements or metallic elements), but preferably does not include impurities other than hafnium or other unavoidable impurities. Examples may include the zirconia sintered body according to the present embodiment containing effectively no zinc, having a zinc content relative to the weight of the sintered body of less than 0.08 wt % in terms of ZnO, and further having a zinc content of 0.05 wt % or less.

The zirconia sintered body according to the present embodiment has the composition described above and also contains grains of aluminum oxide. This inhibits translucency deriving from the zirconia, and as a result even when the sample is configured to be thin in a thickness direction, it is believed that the color tone of the sample is less likely to change from the original color tone of the sintered body. The aluminum oxide is preferably alumina.

Furthermore, in the zirconia sintered body according to the present embodiment, the aluminum oxide grains are considered to be contained not only on the surface of the sintered body but also within the sintered body, and with such a structure, the total light transmittance with respect to the D65 light source at a sample thickness of 1 mm is considered to be 5% or less, preferably 3% or less, and more preferably 2% or less. Preferably, the zirconia sintered body according to the present embodiment has a total light transmittance with respect to the D65 light source of 8% or less, more preferably 6% or less, and still more preferably 3% or less even when the sample thickness is 0.5 mm.

In SEM observation, aluminum oxide grains can be identified as grains with a different color from the zirconia crystal grains, and can be identified as grains that are dispersed at the grain boundary of the zirconia crystal grains. Also, the shape of the aluminum oxide may be an irregular shape, for example.

The color tone of the zirconia sintered body according to the present embodiment preferably has an $L^*$, $a^*$, and $b^*$ in $L^*a^*b^*$ color space that satisfy the following conditions. By satisfying the $L^*$, $a^*$, and $b^*$ below, the sintered body is visually observed to have a pink-group color tone, and in particular a warm pink color tone.

In the zirconia sintered body according to the present embodiment, preferably a color tone at a sample thickness of 1.0 mm and a color tone at a sample thickness of 0.5 mm are roughly equal, and preferably the color tone at the sample thickness of 0.5 mm is:

$75 \leq L^* \leq 98$, preferably $80 \leq L^* \leq 95$, more preferably $83 \leq L^* \leq 93$ $0 \leq a^* \leq 10$, preferably $1 \leq a^* \leq 8$, more preferably $2 \leq a \leq 5$ $5 \leq b^* \leq 20$, preferably $5 \leq b^* \leq 15$, more preferably $5 \leq b^* \leq 12$ For the sintered body according to the present embodiment, the maximum value of $\Delta b^*$ ($b^*_{MAX}$) obtained from Formula A above is preferably 3.0 or less, and more preferably 1.0 or less. Also, for the sintered body according to the present embodiment, the maximum value of $\Delta a^*$ ($a^*_{MAX}$) obtained from Formula B above is preferably 0.6 or less, and more preferably 0.5 or less.

The zirconia sintered body according to the present embodiment preferably has a density of 95.0% or more as a relative density, and preferably 99.5% or more. An example of a density that corresponds to such a density may be a density measured using a method according to JIS R 1634 (measured density) that is 5.325 g/cm³ or more and 6.265 g/cm³ or less, and preferably is 5.540 g/cm³ or more and 6.265 g/cm³ or less, for example.

The zirconia sintered body according to the present embodiment preferably has a three-point bending strength that is measured using a method according to JIS R 1601 of 1000 MPa or more, more preferably 1100 MPa or more, still more preferably 1200 MPa or more, and still further preferably 1350 MPa or more. So long as the three-point bending strength is 1600 MPa or less, and further is 1500 MPa or less, the sintered body is more easily worked.

The zirconia sintered body according to the present embodiment exhibits a warm pink color even when configured as a thin component, and therefore can of course be appropriately used in components such as jewelry and decorative components, for example various components such as time-telling components and exterior components for portable electronic devices, and can also be appropriately used in applications for conventional zirconia sintered bodies, such as structural materials, optical materials, and dental materials.

Any method may be used to manufacture the zirconia sintered body of the present disclosure, but an exemplary manufacturing method is given below.

The zirconia sintered body exhibiting a pale pink color, which is one embodiment according to the present disclosure, can be manufactured by a manufacturing method that includes a step of sintering a green body having a powder composition containing 3.0 wt % or more and 30.0 wt % or less of an aluminum compound in terms of $Al_2O_3$, 0.1 wt % or more and 2.0 wt % or less of an iron compound in terms of $Fe_2O_3$, and 0.1 wt % or more and 1.0 wt % or less of a cobalt compound in terms of $Co_3O_4$, and zirconia containing 2.0 mol % or more and 4.0 mol % or less of erbia as a remainder.

The powder composition is a composition in a state where the aluminum compound, iron compound, cobalt compound, and erbia-containing zirconia are uniformly mixed.

Also, the zirconia sintered body exhibiting a bright pink color, which is one embodiment according to the present disclosure, can be manufactured by a manufacturing method that includes a step of sintering a green body having a powder composition containing 3.0 wt % or more and 30.0 wt % or less of an aluminum compound in terms of $Al_2O_3$ and zirconia containing 2.0 mol % or more and 4.0 mol % or less of erbia as a remainder.

The powder composition is a composition in a state where the aluminum compound and erbia-containing zirconia are uniformly mixed.

Also, the zirconia sintered body exhibiting a warm pink color, which is one embodiment according to the present disclosure, can be manufactured by a manufacturing method that includes a step of sintering a green body having a powder composition containing 3.0 wt % or more and 30.0 wt % or less of an aluminum compound in terms of $Al_2O_3$, 0.01 wt % or more and 2.0 wt % or less of an iron compound in terms of $Fe_2O_3$, and less than 1.0 wt % of a cobalt compound in terms of $Co_3O_4$, and zirconia containing 2.0 mol % or more and 4.0 mol % or less of erbia as a remainder.

The powder composition is a composition in a state where the aluminum compound, iron compound, cobalt compound, and erbia-containing zirconia are uniformly mixed.

The aluminum compound may be a compound or salt containing aluminum (Al). Alumina ($Al_2O_3$) or an alumina precursor aluminum compound is preferred. At least one selected from the group consisting of alumina, aluminum hydroxide, aluminum nitrate, and aluminum chloride is preferred. Alumina is more preferred, and α-alumina is still more preferred.

The iron compound may be a compound or salt containing iron (Fe). At least one selected from the group of iron oxide, iron hydroxide, iron oxyhydroxide, iron nitrate, and iron chloride is preferred. At least one selected from the group of iron (II) oxide, iron (III) oxide, iron hydroxide, and iron oxyhydroxide is more preferred.

The cobalt compound may be a compound or salt containing cobalt (Co). At least one selected from the group of cobalt (II) oxide, tricobalt tetraoxide, cobalt hydroxide, cobalt nitrate, and cobalt chloride is preferred. At least one selected from the group of cobalt (II) oxide, tricobalt tetraoxide, and cobalt hydroxide is more preferred.

The erbia-containing zirconia is preferably an erbia-stabilized zirconia. and is more preferably an erbia-stabilized zirconia in a state where a hydrous zirconia sol containing erbia has been heat-treated. The erbia content of the erbia-containing zirconia is 2.0 mol % or more and 4.0 mol % or less, preferably 2.5 mol % or more and 3.5 mol % or less.

The green body is in a state where a powder composition has been molded. The green body may have any desired shape, keeping in mind shrinkage due to sintering. Examples of the shape can include a circular plate shape, a circular column shape, a polyhedral shape, a column shape, a plate shape, a spherical shape, laminated shape and a substantially spherical shape, but any desired shape may be used depending on the application.

The green body is obtained by molding the powder composition using a known method, for example at least one selected from the group of uniaxial pressing, cold isostatic pressing, slip casting, and injection molding.

Sintering the green body yields a sintered body. Any sintering method may be used, examples including known sintering methods such as pressureless sintering, hot pressing, hot isostatic pressing, and plasma sintering. Due to its convenience, the sintering method is preferably pressureless sintering, examples of which can include pressureless sintering in an air atmosphere. Pressureless sintering is a method of sintering by merely heating without applying an external force to the green body during sintering. Using only pressureless sintering to sinter yields the zirconia sintered body according to the present embodiment as a pressureless sintered body, normal-pressure sintered body or atmospheric sintered body.

When using pressureless sintering, the sustained temperature is 1300° C. or more and 1550° C. or less, preferably 1350° C. or more and 1550° C. or less, and the sustained time is one hour or more and five hours or less, preferably two hours or more and four hours or less, for example.

After pressureless sintering, the sintered body may be treated with hot isostatic pressing (hereafter also referred to as "HIP") to obtain HIP treated body. Examples of the conditions for the HIP treatment may include using an argon atmosphere or nitrogen atmosphere as a HIP treatment atmosphere; 50 MPa or more and 200 MPa or less as a HIP treatment pressure; 1400° C. or more and 1550° C. or less as a HIP treatment temperature; and 30 minutes or more and four hours or less as a sustained time at the HIP treatment temperature.

The sintered zirconia sintered body may be worked as desired, including polishing and shape machining as needed.

EXAMPLES

Hereafter, a detailed description of a zirconia sintered body according to the present embodiment is given using working examples. However, the present invention is not limited to the following examples.

Average Particle Size of Powder

The 50% diameter (median diameter) for a volume particle size distribution measured using a laser diffraction method was measured and taken as the average particle size of a powder.

A slurry in which a powdered sample was suspended in distilled water was pre-treated by a three minute dispersion treatment in an ultrasonic homogenizer (model name: US-150T, manufactured by NISSEI). Using a MicroTrac particle size analyzer (model name: 9320-HRA, manufactured by Honeywell), the volume particle size distribution of the slurry following pre-treatment was measured by a laser diffraction method. The particle size corresponding to an accumulation volume of 50% in the resultant particle size distribution was taken as the average particle size.

Total Light Transmittance

The total light transmittance when a light source F2 is used as incident light was measured with a method according to JIS K 7361. A sintered body underwent double-surface polishing to yield a measurement sample having a surface roughness (Ra)≤0.02 μm. The measurement of the total light transmittance used a hazemeter (model name: NDH 2000, manufactured by Nippon Denshoku Industries) and set the incident light as a D65 light source to measure the total light transmittance for the incident light.

Measurement of Color Tone

The color tone of the sintered body sample was measured with a method according to JIS Z 8722. A generic spectrophotometer (model name: CM-700d, manufactured by Konica Minolta, Inc.) was used to take the measurement. Measurement conditions are noted below.

Light source: F2 light source
View angle: 10°

A sample having a disc shape 20 mm in diameter by 2.7 mm thick was used as the sintered body sample. Both surfaces of the sintered body sample were ground to first achieve a thickness of 1.0 mm or 0.5 mm. after which a surface that has undergone mirror-polishing was designated as an evaluation surface and was evaluated for color tone. A color tone evaluation effective area 10 mm in diameter was used.

Color Differences

Color differences were measured by a method according to JIS Z 8722. For the measurement, a common variation angle spectroscopy system (device name: GCMS-4, manufactured by Murakami Color Research Laboratory) was used. Measurement conditions are noted below.

Light source: F2 light source
Incident angle: 60°
Light receiving angle: −70~70°
Tilt angle: 0°

For the sintered body sample, a plate with a shape 50 mm long by 50 mm wide by 3 mm thick and polished to a surface roughness (Ra)≤0.02 was used.

$a^*_n$, $a^*_{(-50)}$, $b^*_n$, and $b^*_{(-50)}$ were calculated using, of the results for the measurements noted above, the measurement results for a light receiving angle of −50° or more and −30° or less, omitting data measured at a light receiving angle that is significantly influenced by measurement noise, and $\Delta a^*$, $\Delta b^*$, $\Delta a^*_{MAX}$, and $\Delta b^*_{MAX}$ were calculated for each light receiving angle according to Formula A and Formula B.

Three-Point Bending Strength

The three-point bending strength of the sintered body sample was measured with a method according to JIS R 1601. The measurement was performed ten times and the average value was adopted as the three-point bending strength. The measurement was performed using a sintered body sample having a columnar shape with a 4 mm width and a 3 mm thickness, with a distance between support points being 30 mm.

Density

The density of the sintered body was measured with a method according to JIS R 1634, and the measured density was calculated.

Average Crystal Grain Size

The average crystal grain size was calculated with a planimetric method using an SEM observation image obtained using a scanning electron microscope (model name: JSM-6390 LV, manufactured by JEOL Ltd.). SEM observation was carried out on a sintered body sample in which a sintered body polished to achieve a surface roughness (Ra)≤0.02 μm had been thermally etched. Conditions for the SEM observation are noted below.
Acceleration voltage: 15 KV
Magnification: 5000 times A circle was drawn on the SEM observation image such that the sum of the number of crystal grains within the circle (Nc) and the number of crystal grains on the circumference of the circle (Ni) was 125±25, and the average crystal grain size was calculated using the formula below. When Nc and Ni did not satisfy 125±25, a plurality of SEM photographs were used.

Average crystal grain size=$(Nc+(½)×Ni)/(A/M^2)$

In the above formula, Nc is the number of crystal grains within the circle, Ni is the number of crystal grains on the circumference of the circle, A is the area of the circle, and M is the magnification power of the scanning electron microscope.

Example 1-1

Erbia was added to an aqueous solution of zirconium oxychloride to achieve an $Er_2O_3$ concentration of 3.2 mol %, then the solution underwent hydrolysis to yield a hydrous zirconia sol. The resulting hydrous zirconia sol was dried, then was heat-treated for two hours at 1100° C. in air, and was thoroughly washed with ion exchange water. The resulting 3.2 mol % erbia-stabilized zirconia, high-purity alumina (manufactured by Sumitomo Chemicals), iron oxide ($Fe_2O_3$) (manufactured by Kanto Kagaku), and cobalt oxide ($Co_3O_4$) (manufactured by Kishida Chemical) were added to ion exchange water to form a slurry, and this slurry underwent wet mixing using a ball mill. During the wet mixing, slurry was removed as appropriate, and when the average particle size of the slurry reached 0.50 μm, the ball mill was stopped and the slurry was collected. The collected slurry was dried in air at 110° C., and a powder composition with a BET specific surface area of 11 $m^2$/g was obtained having the composition noted below.
Alumina: 5.0 wt %
Iron oxide: 0.17 wt %
Cobalt oxide: 0.12 wt %
3.2 mol % erbia-stabilized zirconia: Remainder The resulting powder composition was uniaxially pressure molded at a pressure of 1000 kg/$cm^2$ to yield a green body, which was sintered in air at a heating rate of 100° C./hour and a sustained temperature of 1450° C. for a sustained time of two hours to yield a zirconia sintered body. The resulting zirconia sintered body exhibited a pale pink color and had a relative density of 99.9%. The zirconia crystal grains and aluminum oxide grains on the surface and cross-section of the sintered body were identified through SEM observation.

The zirconia sintered body underwent polishing to achieve a sample thickness of 1 mm and a surface roughness (Ra)≤0.02 μm. The polished zirconia sintered body had a total light transmittance of 0.02%, and visual observation of the polished surface resulted in the sintered body exhibiting a pale pink color. After observation, the sintered body was polished to achieve a sample thickness of 0.5 mm and a surface roughness (Ra)≤0.02 μm. As a result, the total light transmittance was 0.40%, and visual observation of the polished surface resulted in the sintered body exhibiting a pale pink color.

Example 1-2

Using a similar method to example 1-1 except that the composition of the powder composition was configured with the composition noted below, the zirconia sintered body of the present example was obtained.
Alumina: 3.0 wt %
Iron oxide: 0.17 wt %
Cobalt oxide: 0.12 wt %
3.2 mol % erbia-stabilized zirconia: Remainder The resulting zirconia sintered body exhibited a pale pink color and had a relative density of 99.9%. The zirconia crystal grains and aluminum oxide grains on the surface and cross-section of the sintered body were identified through SEM observation.

The zirconia sintered body was polished with a similar method as in example 1-1, and was evaluated when the sample thickness was 1 mm, after which the sintered body was further polished and was once more evaluated when the sample thickness was 0.5 mm.

The zirconia sintered body had a total light transmittance of 0.05% and exhibited a pale pink color when the sample thickness was 1 mm and the surface roughness (Ra) was ≤0.02 μm, and had a total light transmittance of 0.80% and exhibited a pale pink color when the sample thickness was 0.5 mm and the surface roughness (Ra) was ≤0.02 μm.

Example 1-3

Using a similar method to example 1-1 except that the composition of the powder composition was configured with the composition noted below, the zirconia sintered body of the present example was obtained.

Alumina: 5.0 wt %
Iron oxide: 0.21 wt %
Cobalt oxide: 0.15 wt %
3.2 mol % erbia-stabilized zirconia: Remainder The resulting zirconia sintered body exhibited a pale pink color and had a relative density of 99.9%. The zirconia crystal grains and aluminum oxide grains on the surface and cross-section of the sintered body were identified through SEM observation.

The zirconia sintered body was polished with a similar method as in example 1-1, and was evaluated when the sample thickness was 1 mm, after which the sintered body was further polished and was once more evaluated when the sample thickness was 0.5 mm.

The zirconia sintered body had a total light transmittance of 0.01% and exhibited a pale pink color when the sample thickness was 1 mm and the surface roughness (Ra) was ≤0.02 μm, and had a total light transmittance of 0.20% and exhibited a pale pink color when the sample thickness was 0.5 mm and the surface roughness (Ra) was ≤0.02 μm. Results for these examples are given in the following table.

TABLE 1

| | $Al_2O_3$ (wt %) | $Fe_2O_3$ (wt %) | $Co_3O_4$ (wt %) | Measured density (g/cm$_3$) | Color tone (sample thickness 0.5 mm) L* | a* | b* | Total light transmittance (%) Sample thickness 1.0 mm | Sample thickness 0.5 mm | Three-point bending strength (MPa) |
|---|---|---|---|---|---|---|---|---|---|---|
| Example 1-1 | 5 | 0.17 | 0.12 | 6.141 | 66.37 | 2.25 | 7.23 | 0.02 | 0.40 | 1450 |
| Example 1-2 | 3 | 0.17 | 0.12 | 6.211 | 63.02 | 2.31 | 7.27 | 0.05 | 0.80 | 1374 |
| Example 1-3 | 5 | 0.21 | 0.15 | 6.141 | 64.54 | 2.28 | 6.91 | 0.01 | 0.20 | 1472 |

The coloration of the zirconia sintered bodies according to the examples was visually recognized as a pale pink in all cases. In addition, the total light transmittance at a sample thickness of 1.0 mm is 0.05% or less, and translucency deriving from the erbia-containing zirconia (matrix) was confirmed to be markedly constrained. Moreover, the three-point bending strength was 1350 MPa or more, and the sintered body was confirmed to have sufficient strength for application in decorative material, for example.

Furthermore, the $a^*_{MAX}$ and $b^*_{MAX}$ of the sintered body according to example 1-1 were 0.19 and 0.62, respectively, whereas the $a^*_{MAX}$ and $b^*_{MAX}$ of the sintered body according to example 1-2 were 0.22 and 0.55, respectively. The maximum value of $\Delta b^*$ was less than 1.00 and the maximum value of $\Delta a^*$ was 0.50 or less for both examples. It was confirmed that, even when the sintered body was viewed from different angles, there was no color difference and similar color tones were visually recognized from every angle.

The values for $\Delta a^*$ and $\Delta b^*$ at the primary light receiving angle are shown in the following table.

TABLE 2

| | | Light receiving angle | | | | |
|---|---|---|---|---|---|---|
| | | −40° | −20° | 0° | 10° | 20° |
| Example 1-1 | $\Delta a^*$ | 0.12 | 0.18 | 0.15 | 0.10 | 0.09 |
| | $\Delta b^*$ | 0.08 | 0.17 | 0.04 | 0.07 | 0.32 |

TABLE 2-continued

| | | Light receiving angle | | | | |
|---|---|---|---|---|---|---|
| | | −40° | −20° | 0° | 10° | 20° |
| Example 1-2 | $\Delta a^*$ | 0.10 | 0.20 | 0.18 | 0.14 | 0.10 |
| | $\Delta b^*$ | 0.11 | 0.16 | 0.02 | 0.07 | 0.28 |

The sintered bodies according to the examples are confirmed to have a smaller degree of variation between the values for $\Delta a^*$ and $\Delta b^*$ at each light receiving angle. Accordingly, it is understood that, even when the sintered bodies of the examples are viewed from different angles, relatively similar color tones may be visually recognized.

Example 2-1

Erbia was added to an aqueous solution of zirconium oxychloride to achieve an $Er_2O_3$ concentration of 3.2 mol %, then the solution underwent hydrolysis to yield a hydrous zirconia sol. The resulting hydrous zirconia sol was dried, then was heat-treated for two hours at 1100° C. in air, and was thoroughly washed with ion exchange water. The resulting 3.2 mol % erbia-stabilized zirconia and high-purity alumina (manufactured by Sumitomo Chemicals) were added to the ion exchange water to form a slurry, and this slurry underwent wet mixing using a ball mill. During the wet mixing, slurry was removed as appropriate, and when the average particle size of the slurry reached 0.50 μm, the ball mill was stopped and the slurry was collected. The collected slurry was dried in air at 110° C., and a powder composition with a BET specific surface area of 11 m$^2$/g was obtained having the composition noted below.

Alumina: 3.0 wt %
3.2 mol % erbia-stabilized zirconia: Remainder

The resulting powder composition was uniaxially pressure molded at a pressure of 1000 kg/cm$^2$ to yield a green body, which was sintered in air at a heating rate of 100° C./hour and a sustained temperature of 1450° C. for a sustained time of two hours to yield a zirconia sintered body. The resulting zirconia sintered body exhibited a bright pink color and had a relative density of 99.9%. The zirconia crystal grains and aluminum oxide grains on the surface and cross-section of the sintered body were identified through SEM observation.

The zirconia sintered body underwent polishing to achieve a sample thickness of 1 mm and a surface roughness (Ra)≤0.02 μm. The polished zirconia sintered body had a total light transmittance of 8%, and visual observation of the polished surface resulted in the sintered body exhibiting a bright pink color.

Example 2-2

Using a similar method to example 2-1 except that the composition of the powder composition was configured with the composition noted below, the zirconia sintered body of the present example was obtained.
Alumina: 5.0 wt %
3.2 mol % erbia-stabilized zirconia: Remainder
The resulting zirconia sintered body exhibited a bright pink color and had a relative density of 99.9%. The zirconia crystal grains and aluminum oxide grains on the surface and cross-section of the sintered body were identified through SEM observation.

The zirconia sintered body was polished with a similar method as in example 2-1, and was evaluated when the sample thickness was 1 mm.

The zirconia sintered body had a total light transmittance of 7% and exhibited a bright pink color when the sample thickness was 1 mm and the surface roughness (Ra) was ≤0.02 μm.

Example 2-3

Using a similar method to example 2-1 except that the composition of the powder composition was configured with the composition noted below, the zirconia sintered body of the present example was obtained.
Alumina: 10.0 wt %
3.2 mol % erbia-stabilized zirconia: Remainder
The resulting zirconia sintered body exhibited a bright pink color and had a relative density of 99.9%. The zirconia crystal grains and aluminum oxide grains on the surface and cross-section of the sintered body were identified through SEM observation.

The zirconia sintered body was polished with a similar method as in example 2-1, and was evaluated when the sample thickness was 1 mm.

The zirconia sintered body had a total light transmittance of 4% and exhibited a bright pink color when the sample thickness was 1 mm and the surface roughness (Ra) was ≤0.02 μm.

Example 2-4

Using a similar method to example 2-1 except that the composition of the powder composition was configured with the composition noted below, the zirconia sintered body of the present example was obtained.
Alumina: 15.0 wt %
3.2 mol % erbia-stabilized zirconia: Remainder
The resulting zirconia sintered body exhibited a bright pink color and had a relative density of 99.9%. The zirconia crystal grains and aluminum oxide grains on the surface and cross-section of the sintered body were identified through SEM observation.

The zirconia sintered body was polished with a similar method as in example 2-1, and was evaluated when the sample thickness was 1 mm.

The zirconia sintered body had a total light transmittance of 3% and exhibited a bright pink color when the sample thickness was 1 mm and the surface roughness (Ra) was ≤0.02 μm.

Comparative Example 2-1

Using a similar method to example 2-1 except that the composition of the powder composition was configured with the composition noted below, the zirconia sintered body of the present example was obtained.
Alumina: 0.05 wt %
3.2 mol % erbia-stabilized zirconia: Remainder
The resulting zirconia sintered body exhibited a pink color and had a relative density of 99.9%. Only zirconia crystal grains were observed on the surface and cross-section of the sintered body through SEM observation; no alumina grains were observed.

The zirconia sintered body was polished with a similar method as in example 2-1, and was evaluated when the sample thickness was 1 mm.

The zirconia sintered body had a high total light transmittance of 28% and the color tone of the sintered body was observed to change due to the influence of a color tone in the background when the sample thickness was 1 mm and the surface roughness (Ra) was ≤0.02 μm.

Results for these examples and comparative example are given in the following table.

TABLE 3

|  | $Er_2O_3$ (mol %) | $Al_2O_3$ (wt %) | Measured density (g/cm³) | Color tone (sample thickness 1.0 mm) | | | Total light transmittance (%) Sample thickness 1.0 mm | Three-point bending strength (MPa) |
| --- | --- | --- | --- | --- | --- | --- | --- | --- |
|  |  |  |  | L* | a* | b* |  |  |
| Example 2-1 | 3.2 | 3.0 | 6.215 | 89.75 | 12.40 | −0.06 | 8 | 1257 |
| Example 2-2 | 3.2 | 5.0 | 6.148 | 91.35 | 11.43 | −0.03 | 7 | 1221 |
| Example 2-3 | 3.2 | 10.0 | 5.975 | 92.99 | 9.18 | 0.70 | 4 | 1301 |
| Example 2-4 | 3.2 | 15.0 | 5.810 | 94.31 | 8.24 | 0.03 | 3 | 1245 |
| Comp. Ex. 2-1 | 3.2 | 0.05 | 6.332 | 88.02 | 18.2 | 1.89 | 28 | 1205 |

The coloration of the zirconia sintered bodies according to the examples is visually recognized as a bright pink in all cases. In addition, the total light transmittance at a sample thickness of 1.0 mm is 10% or less, and translucency deriving from the erbia-containing zirconia (matrix) was confirmed to be markedly constrained. Moreover, the three-point bending strength was 1200 MPa or more, and the sintered body was confirmed to have sufficient strength for application in decorative material, for example.

Furthermore, the $a^*_{MAX}$ and $b^*_{MAX}$ of the sintered body according to example 2-1 were 0.42 and 0.75, respectively, whereas the $a^*_{MAX}$ and $b^*_{MAX}$ of the sintered body according to example 2-4 were 0.34 and 0.83, respectively. The maximum value of $\Delta b^*$ was less than 1.00 and the maximum value of $\Delta a^*$ was 0.50 or less for both examples. It was confirmed that, even when the sintered body was viewed from different angles, there was no color difference and similar color tones were visually recognized from every angle. In contrast, the $a^*_{MAX}$ and $b^*_{MAX}$ of comparative example 2-1 were 0.86 and 0.80, respectively.

The values for $\Delta a^*$ and $\Delta b^*$ at the primary light receiving angle are shown in the following table.

TABLE 4

|  |  | Light receiving angle | | | | |
| --- | --- | --- | --- | --- | --- | --- |
|  |  | −40° | −20° | 0° | 10° | 20° |
| Example 2-1 | $\Delta a^*$ | 0.27 | 0.41 | 0.39 | 0.33 | 0.24 |
|  | $\Delta b^*$ | 0.07 | 0.1 | 0.27 | 0.46 | 0.59 |
| Example 2-4 | $\Delta a^*$ | 0.21 | 0.32 | 0.34 | 0.23 | 0.17 |
|  | $\Delta b^*$ | 0.05 | 0.08 | 0.28 | 0.43 | 0.62 |
| Comp. Ex. 2-1 | $\Delta a^*$ | 0.52 | 0.80 | 0.82 | 0.71 | 0.57 |
|  | $\Delta b^*$ | 0.11 | 0.14 | 0.36 | 0.48 | 0.62 |

It is understood that the zirconia sintered bodies according to the comparative examples have a large degree of variation in $\Delta a^*$ and $\Delta b^*$ values for each light receiving angle, and, depending on the observation angle of the sintered body, the visually recognized color tone varies significantly. In contrast, the sintered bodies according to the examples are confirmed to have a smaller degree of variation between the values for $\Delta a^*$ and $\Delta b^*$ at each light receiving angle. Accordingly, it is understood that, even when the sintered bodies of the examples are viewed from different angles, relatively similar color tones may be visually recognized.

Example 3-1

Erbia was added to an aqueous solution of zirconium oxychloride to achieve an $Er_2O_3$ concentration of 3.2 mol %, then the solution underwent hydrolysis to yield a hydrous zirconia sol. The resulting hydrous zirconia sol was dried, then was heat-treated for two hours at 1100° C. in air, and was thoroughly washed with ion exchange water. The resulting 3.2 mol % erbia-stabilized zirconia, high-purity alumina (manufactured by Sumitomo Chemicals), and iron oxide ($Fe_2O_3$) (manufactured by Kanto Kagaku) were added to ion exchange water to form a slurry, and this slurry underwent wet mixing using a ball mill. During the wet mixing, slurry was removed as appropriate, and when the average particle size of the slurry reached 0.50 μm, the ball mill was stopped and the slurry was collected. The collected slurry was dried in air at 110° C., and a powder composition with a BET specific surface area of 11 $m^2/g$ was obtained having the composition noted below.

Alumina: 12.5 wt %
Iron oxide: 0.20 wt %
3.2 mol % erbia-stabilized zirconia: Remainder The resulting powder composition was uniaxially pressure molded at a pressure of 1000 kg/cm² to yield a green body, which was sintered in air at a heating rate of 100° C./hour and a sustained temperature of 1450° C. for a sustained time of two hours to yield a zirconia sintered body. The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body underwent polishing to achieve a sample thickness of 1 mm and a surface roughness (Ra)≤0.02 μm. The polished zirconia sintered body had a total light transmittance of 1.2%, and visual observation of the polished surface resulted in the sintered body exhibiting a warm pink color. After observation, the sintered body was polished to achieve a sample thickness of 0.5 mm and a surface roughness (Ra)≤0.02 μm. As a result, the total light transmittance was 4.2%, and visual observation of the polished surface resulted in the sintered body exhibiting a warm pink color.

Example 3-2

Using a similar method to example 3-1 except that the composition of the powder composition was configured with the composition noted below, the zirconia sintered body of the present example was obtained.

Alumina: 15.0 wt %
Iron oxide: 0.23 wt %
3.2 mol % erbia-stabilized zirconia: Remainder The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 0.83% and exhibited a warm pink color when the sample thickness was 1 mm and the surface roughness (Ra) was ≤0.02 μm, and had a total light transmittance of 3.7% and exhibited a warm pink color when the sample thickness was 0.5 mm and the surface roughness (Ra) was ≤0.02 μm.

Example 3-3

Using a similar method to example 3-1 except that the composition of the powder composition was configured with the composition noted below, the zirconia sintered body of the present example was obtained.

Alumina: 10.0 wt %
Iron oxide: 0.20 wt %
3.2 mol % erbia-stabilized zirconia: Remainder The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 1.4% and exhibited a warm pink color when the sample thickness was 1 mm and the surface roughness (Ra) was ≤0.02 μm, and had a total light transmittance of 5.1% and exhibited a warm pink color when the sample thickness was 0.5 mm and the surface roughness (Ra) was ≤0.02 μm.

Example 3-4

Using a similar method to example 3-1 except that 3.2 mol % erbia-stabilized zirconia, high-purity alumina (manufactured by Sumitomo Chemicals), iron oxide ($Fe_2O_3$) (manufactured by Kanto Kagaku), and cobalt oxide ($Co_3O_4$) (manufactured by Kishida Chemical) were used and the composition of the powder composition was configured with the composition noted below, the zirconia sintered body of the present example was obtained.
Alumina: 15.0 wt %
Iron oxide: 0.25 wt %
Cobalt oxide: 0.010 wt %
3.2 mol % erbia-stabilized zirconia: Remainder The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 0.19% and exhibited a warm pink color when the sample thickness was 1 mm and the surface roughness (Ra) was ≤0.02 μm, and had a total light transmittance of 1.8% and exhibited a warm pink color when the sample thickness was 0.5 mm and the surface roughness (Ra) was ≤0.02 μm.

Example 3-5

Using a similar method to example 3-4 except that the composition of the powder composition was configured with the composition noted below, the zirconia sintered body of the present example was obtained.
Alumina: 15.0 wt %
Iron oxide: 0.25 wt %
Cobalt oxide: 0.015 wt %
3.2 mol % erbia-stabilized zirconia: Remainder The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 0.11% and exhibited a warm pink color when the sample thickness was 1 mm and the surface roughness (Ra) was ≤0.02 μm, and had a total light transmittance of 1.4% and exhibited a warm pink color when the sample thickness was 0.5 mm and the surface roughness (Ra) was ≤0.02 μm.

Example 3-6

Using a similar method to example 3-4 except that the composition of the powder composition was configured with the composition noted below, the zirconia sintered body of the present example was obtained.
Alumina: 10.0 wt %
Iron oxide: 0.17 wt %
Cobalt oxide: 0.016 wt %
3.2 mol % erbia-stabilized zirconia: Remainder The resulting zirconia sintered body exhibited a warm pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 0.28% and exhibited a warm pink color when the sample thickness was 1 mm and the surface roughness (Ra) was ≤0.02 μm, and had a total light transmittance of 2.3% and exhibited a warm pink color when the sample thickness was 0.5 mm and the surface roughness (Ra) was ≤0.02 μm.

Comparative Example 3-1

Using a similar method to example 3-4 except that the composition of the powder composition was configured with the composition noted below, the zirconia sintered body of the present example was obtained.
Alumina: 1.0 wt %
Iron oxide: 0.02 wt %
3.2 mol % erbia-stabilized zirconia: Remainder The resulting zirconia sintered body exhibited a hazy pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 15.6% when the sample thickness was 1 mm and the surface roughness (Ra) was ≤0.02 μm, and had a total light transmittance of 24% and the color tone of the sintered body was observed to change due to the influence of a color tone in the background when the sample thickness was 0.5 mm and the surface roughness (Ra) was ≤0.02 μm.

Comparative Example 3-2

Using a similar method to example 3-4 except that the composition of the powder composition was configured with the composition noted below, the zirconia sintered body of the present example was obtained.
Alumina: 1.0 wt %
Iron oxide: 0.02 wt %
Cobalt oxide: 0.005 wt %
3.2 mol % erbia-stabilized zirconia: Remainder The resulting zirconia sintered body exhibited a hazy pink color and had a relative density of 99.9%. The zirconia crystal grains and aluminum oxide grains on the surface and cross-section of the sintered body were identified through SEM observation.

The zirconia sintered body was polished with a similar method as in example 3-1, and was evaluated when the sample thickness was 1 mm, after which the sintered body was further polished and was once more evaluated when the sample thickness was 0.5 mm.

The zirconia sintered body had a total light transmittance of 9.7% and exhibited a hazy pink color with inferior aesthetics that mixed with background colors when the sample thickness was 1 mm and the surface roughness (Ra) was ≤0.02 μm, and had a total light transmittance of 20.3% and exhibited a hazy pink color with inferior aesthetics that mixed with background colors when the sample thickness was 0.5 mm and the surface roughness (Ra) was ≤0.02 μm.

Results for these examples and comparative examples are given in Table 5.

TABLE 5

| | Al$_2$O$_3$ (wt %) | Fe$_2$O$_3$ (wt %) | Co$_3$O$_4$ (wt %) | Measured density (g/cm$^3$) | Color tone (sample thickness 0.5 mm) | | | Total light transmittance (%) | | Three-point bending strength (MPa) |
| | | | | | L* | a* | b* | Sample thickness 1.0 mm | Sample thickness 0.5 mm | |
|---|---|---|---|---|---|---|---|---|---|---|
| Ex. 3-1 | 12.5 | 0.20 | — | 5.878 | 88.99 | 4.64 | 11.83 | 1.2 | 4.2 | 1307 |
| Ex. 3-2 | 15 | 0.23 | — | 5.798 | 89.73 | 4.22 | 11.87 | 0.83 | 3.7 | 1323 |
| Ex. 3-3 | 10 | 0.20 | — | 5.969 | 87.59 | 4.91 | 13.36 | 1.4 | 5.1 | 1408 |
| Ex. 3-4 | 15 | 0.25 | 0.010 | 5.828 | 86.74 | 3.69 | 10.79 | 0.19 | 1.8 | 1410 |
| Ex. 3-5 | 15 | 0.25 | 0.015 | 5.824 | 85.61 | 3.34 | 10.02 | 0.11 | 1.4 | 1384 |
| Ex. 3-6 | 10 | 0.17 | 0.016 | 5.972 | 84.62 | 3.72 | 9.30 | 0.28 | 2.3 | 1478 |
| Comp. Ex. 3-1 | 1 | 0.02 | — | 6.278 | 90.28 | 13.65 | 8.25 | 15.6 | 24 | 1232 |
| Comp. Ex. 3-2 | 1 | 0.02 | 0.005 | 6.279 | 84.14 | 11.41 | 4.88 | 9.7 | 20.3 | 1362 |

The coloration of the zirconia sintered bodies according to the examples was visually recognized as a warm pink in all cases. In addition, the total light transmittance at a sample thickness of 1.0 mm was 5% or less, and translucency deriving from the erbia-containing zirconia (matrix) was confirmed to be markedly constrained. Moreover, the three-point bending strength was 1300 MPa or more, and the sintered body was confirmed to have sufficient strength for application in decorative material, for example.

Moreover, the a*$_{MAX}$ and b*$_{MAX}$ for each sintered body was, respectively: 0.23 and 0.72 for example 3-1, 0.19 and 0.72 for example 3-2, 0.24 and 0.76 for example 3-3, 0.17 and 0.84 for example 3-4, 0.14 and 0.78 for example 3-5, and 0.62 and 0.75 for comparative example 3-1.

The values for Δa* and Δb* at the primary light receiving angle are shown in the following table.

TABLE 6

| | | Light receiving angle | | | | |
| | | −40° | −20° | 0° | 10° | 20° |
|---|---|---|---|---|---|---|
| Example 3-1 | Δa* | 0.11 | 0.22 | 0.2 | 0.09 | 0.03 |
| | Δb* | 0.22 | 0.25 | 0.08 | 0.16 | 0.39 |
| Example 3-2 | Δa* | 0.09 | 0.19 | 0.17 | 0.1 | 0.01 |
| | Δb* | 0.22 | 0.25 | 0.06 | 0.14 | 0.39 |
| Example 3-3 | Δa* | 0.13 | 0.24 | 0.23 | 0.15 | 0.05 |
| | Δb* | 0.22 | 0.27 | 0.09 | 0.14 | 0.4 |
| Example 3-4 | Δa* | 0.09 | 0.17 | 0.12 | 0.09 | 0.02 |
| | Δb* | 0.15 | 0.17 | 0 | 0.22 | 0.47 |
| Example 3-5 | Δa* | 0.05 | 0.14 | 0.1 | 0.05 | 0.02 |
| | Δb* | 0.17 | 0.2 | 0 | 0.19 | 0.43 |
| Comp. Ex. 3-1 | Δa* | 0.42 | 0.61 | 0.58 | 0.48 | 0.36 |
| | Δb* | 0.03 | 0.01 | 0.16 | 0.34 | 0.60 |

From the above table, it is understood that the zirconia sintered body according to the comparative example has a large degree of variation in Δa* and Δb* values for each light receiving angle, and, depending on the observation angle of the sintered body, the visually recognized color tone varies significantly. In contrast, the sintered bodies according to the examples are confirmed to have a smaller degree of variation between the values for Δa* and Δb* at each light receiving angle. Accordingly, it is understood that even when the sintered bodies of the examples are viewed from different angles, relatively similar color tones may be visually recognized. The disclosures of the specification of the present invention incorporate, in their entirety, the specification, scope of the claims, and abstract of Japanese Patent Application Nos. 2019-025870, 2019-025861, and 2019-025854 filed on Feb. 15, 2019.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A zirconia sintered body comprising 3.0 wt % or more and 30.0 wt % or less of aluminum in terms of Al$_2$O$_3$ and a remainder is zirconia containing 2 mol % or more and 4 mol % or less of erbia,
wherein the zirconia sintered body includes grains of aluminum oxide and a total light transmittance with respect to a D65 light source at a sample thickness of 1.0 mm is 10% or less, and
wherein a color tone at a sample thickness of 0.5 mm satisfies the following conditions:

$$0 \leq a^* \leq 15, -2.0 \leq b^* \leq 20.$$

2. The zirconia sintered body according to claim 1, wherein a color tone at a sample thickness of 0.5 mm satisfies the following conditions:

$$50 \leq L^* \leq 100.$$

3. The zirconia sintered body according to claim 1, wherein the maximum value of Δb* calculated using Formula A below is 3.0 or less, and the maximum value of Δa* calculated using Formula B below is 0.6 or less:

$$\Delta b^* = b^*_n / b^*_{(-50)} \qquad \text{(Formula A)}$$

$$\Delta a^* = a^*_n / a^*_{(-50)} \qquad \text{(Formula B)}$$

wherein, in each of the formulas above, Δa* and Δb* are, respectively, a difference in hues a* and a difference in hues b* between light receiving angles, $a^*_n$ and $b^*_n$ are, respectively, the hue a* and hue b* at any one light receiving angle of −50° or more to 30° or less, and $a^*_{(-50)}$ and $b^*_{(-50)}$ are, respectively, the hue a* and the hue b* at a light receiving angle of −50°.

4. The zirconia sintered body according to claim 1 containing 0.1 wt % or more and 2.0 wt % or less of iron in terms of $Fe_2O_3$, and 0.1 wt % or more and 1.0 wt % or less of cobalt in terms of $Co_3O_4$, and having a total light transmittance with respect to the D65 light source at a sample thickness of 1.0 mm of 1% or less.

5. The zirconia sintered body according to claim 1, wherein a cobalt content is less than an iron content.

6. The zirconia sintered body according to claim 1, wherein the color tone at a sample thickness of 0.5 mm satisfies the following conditions:

$50 \leq L^* \leq 74, 0 \leq a^* \leq 5, 2 \leq b^* \leq 10.$

7. The zirconia sintered body according to claim 1, wherein the total light transmittance with respect to the D65 light source at a sample thickness of 0.5 mm is 3% or less.

8. The zirconia sintered body according to claim 1, wherein an iron content relative to the weight of the sintered body is less than 0.1 wt % in terms of $Fe_2O_3$.

9. The zirconia sintered body according to claim 1, wherein the color tone at a sample thickness of 0.5 mm satisfies the following conditions:

$50 \leq L^* \leq 74, 0 \leq a^* \leq 5, 2 \leq b^* \leq 10.$

10. The zirconia sintered body according to claim 1, comprising 0.01 wt % or more and 2.0 wt % or less of iron in terms of $Fe_2O_3$, and less than 0.1 wt % of cobalt in terms of $Co_3O_4$, and zirconia containing 2 mol % or more and 4 mol % or less of erbia as a remainder, wherein the zirconia sintered body includes grains of aluminum oxide, and the total light transmittance with respect to the D65 light source at a sample thickness of 1.0 mm is 5% or less.

11. The zirconia sintered body according to claim 1, wherein the total light transmittance with respect to the D65 light source at a sample thickness of 0.5 mm is 8% or less.

12. The zirconia sintered body according to claim 1, wherein the color tone at a sample thickness of 0.5 mm satisfies the following conditions:

$75 \leq L^* \leq 98, 0 \leq a^* \leq 10, 5 \leq b^* \leq 20.$

13. The zirconia sintered body according to claim 1, wherein the zirconia is zirconia in a state where a zirconia sol containing erbia has been heat-treated and the resulting zirconia has been sintered.

14. A component that includes the zirconia sintered body according to claim 1.

* * * * *